United States Patent [19]
Martin et al.

[11] Patent Number: 4,527,305
[45] Date of Patent: Jul. 9, 1985

[54] TENDON CUTTER

[75] Inventors: Eugene G. Martin, New Holland; Dale M. Risser, Denver, both of Pa.

[73] Assignee: FoodCraft Equipment Company, Inc., New Holland, Pa.

[21] Appl. No.: 570,899

[22] Filed: Jan. 16, 1984

[51] Int. Cl.³ ............................................. A22C 21/00
[52] U.S. Cl. .................................................. 17/11.3
[58] Field of Search ................................. 17/11.3, 45

[56] References Cited
U.S. PATENT DOCUMENTS 2,790,200  4/1957  Zebarth ................................. 17/11.3
4,291,434  9/1981  Batts ..................................... 17/11.3

Primary Examiner—Willie G. Abercrombie
Attorney, Agent, or Firm—Price, Heneveld, Huizenga & Cooper

[57] ABSTRACT

A machine for at least partially severing the tendons of an anatomical section, such as a turkey drumstick, including spaced sets of counterrotating stripping discs forming a nip therebetween. A rotary knife is sandwiched between the discs and has its cutting periphery positioned within the narrower sections of the nip. The stripping discs strip the tendons from the bone, forcing it into contact with the knife. The spacing between the discs is such that the bone does not come into contact with the knife.

7 Claims, 5 Drawing Figures

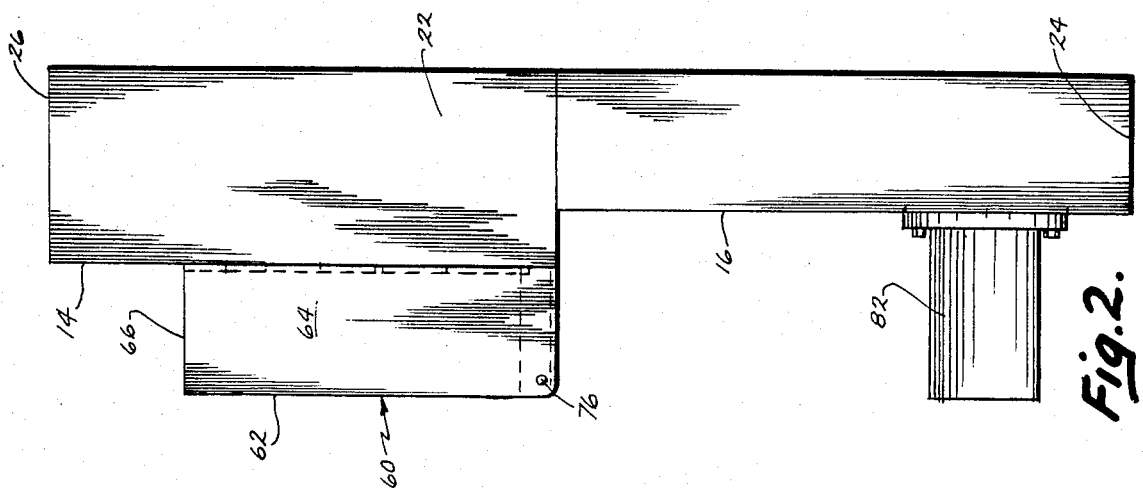
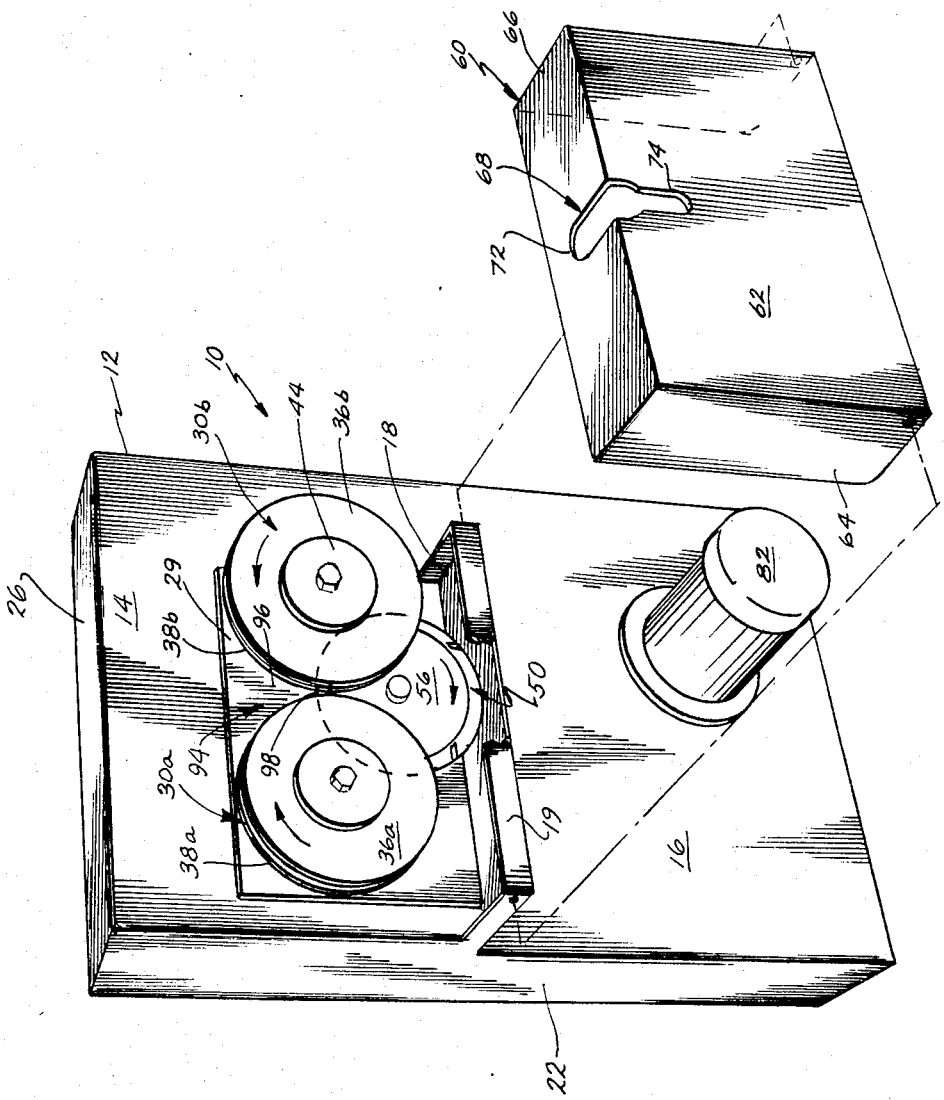

TENDON CUTTER

BACKGROUND OF THE INVENTION

This invention relates to a tendon cutter and, more specifically, to a cutter particularly adapted to at least partially sever the tendons of a bone-containing anatomical section, thereby facilitating removal of the meat therefrom.

U.S. Pat. No. 4,327,463, issued to Eugene G. Martin on May 4, 1982, entitled SINGLE STATION ANATOMICAL SECTION DE-BONING MACHINE, discloses an apparatus particularly adapted to remove the meat from, or debone, the thighs and drumsticks of fowl such as chickens, turkeys and the like. The device which is the subject of this patent, when utilized to debone drumsticks, mechanically grips the hock knuckle and thereafter pulls the drumstick through a restricted orifice, the orifice functioning to longitudinally strip the meat from the bone.

It has been found that when machines of the general type as disclosed in the aforesaid patent are utilized to debone larger anatomical sections such as turkey legs, the bone sometimes fractures during the pulling process, necessitating thereafter hand-removal of the bone and attendant fragments from the meat. This bone breakage is attributable primarily to the fact that the tendons on occasion if not often have a tension strength exceeding that of the bone to which it is attached.

Bone breakage, on any scale other than a very minor one, is unacceptable. Not only is it often necessary to shut down the machine in order to remove the bone and meat fragments and thereafter discard or debone by hand the resultant pieces. It is also necessary to insure that through the provision of sufficient inspection personnel, etc., no bone fragments are present in the deboned meat. This added expense may render what is otherwise an economical money-saving operation unacceptable.

SUMMARY OF THE INVENTION

It is an object of this invention to provide an apparatus for use in conjunction with a deboner of the general type disclosed in the aforenoted patent which functions to sever the tendons prior to introduction of the anatomical section into the deboning machine.

It is a further object of this invention to provide such an apparatus which may be placed in close proximity to the deboning machine and which may be utilized by the same operator that operates the deboning machine to cut the tendons during the time period in which the previous anatomical section is being deboned.

It is an object of this invention, in a more general fashion, to facilitate the economic utilization of deboning machines such as that disclosed in the aforenoted patent.

Briefly, these and other objects of the present invention are accomplished by the provision of an apparatus for at least partially severing the tendons of a bone-containing anatomical section, one extremity of which is composed primarily of bone and tendons. The apparatus comprises first and second spaced, movable means defining a nip therebetween adapted to receive the section extremity. The spacing between the nip-defining means at the point of closest adjacency is less than the diameter of the bone, thereby establishing within the wider portion of the nip a tendon stripping station and within the narrower portion of the nip a tendon severing station. Means are provided for moving the nip-defining means in the same direction at the nip. Means are positioned at the tendon severing station for at least partially severing the tendons, movement of the nip-defining means stripping at least portions of the tendons from said extremity when it is placed in the stripping station and causing the tendon portions to contact the severing means at the severing station.

BRIEF DESCRIPTION OF THE DRAWINGS

FIG. 1 is a partially exploded, fragmentary perspective view of the tendon cutter which is the subject of this invention;

FIG. 2 is a side elevation thereof;

DESCRIPTION OF THE PREFERRED EMBODIMENT

Figure 4:
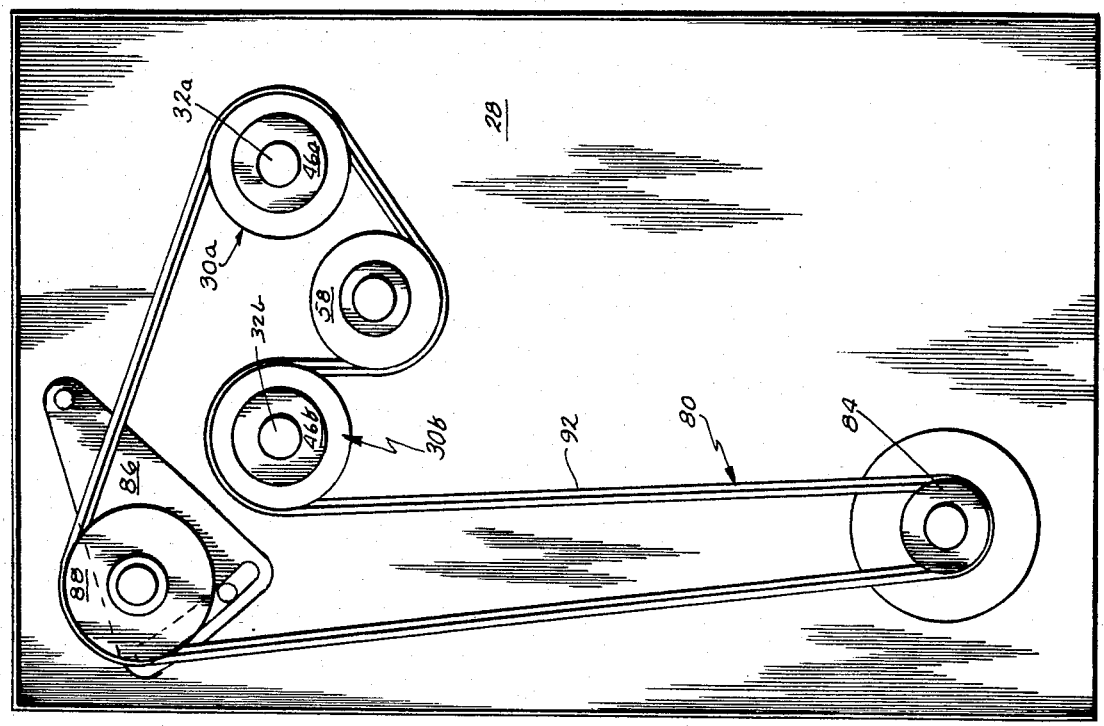
FIG. 4 is a rear elevation thereof with the back cover removed.
Figure 3:
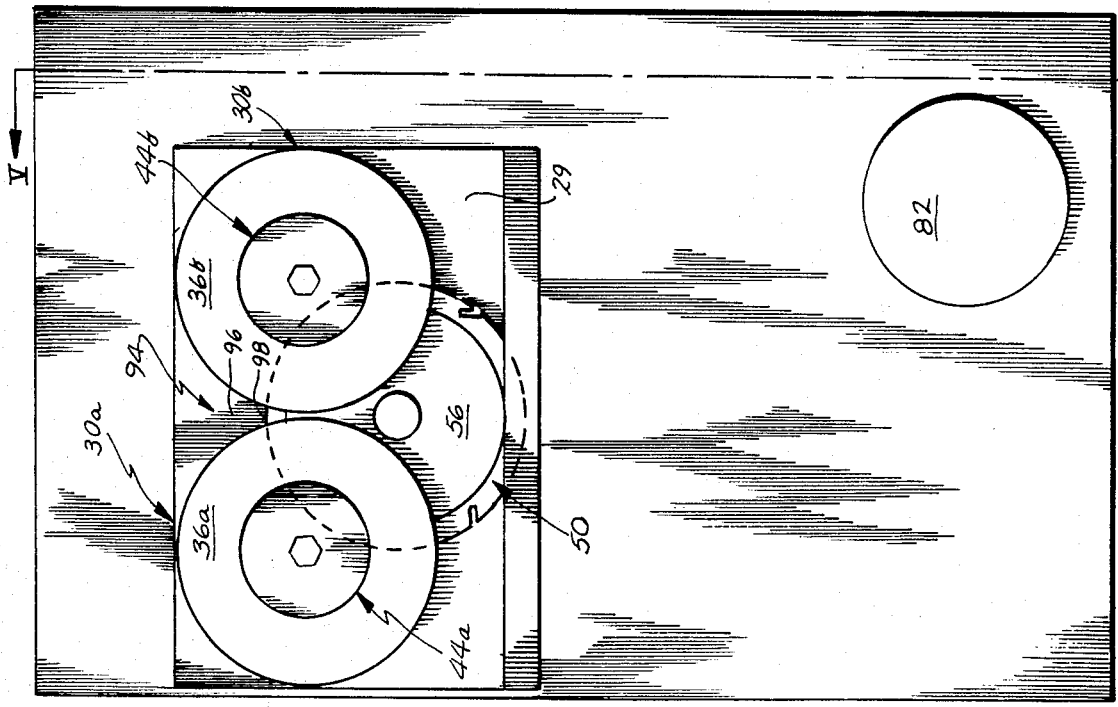
FIG. 3 is a front elevation thereof.

Referring generally to the drawings, the tendon cutter 10 which is the subject of this invention includes a cabinet 12 having an upper front face 14, a recessed lower front face 16 and a forwardly projecting step 18 having a peripheral upturned lip 19. The cabinet also includes sides 22, a bottom 24, a top 26 and a removable back (not shown), the latter components defining a rear drive enclosure 28. The upper front face 14 is reinforced on the interior and exterior by plates 29 to provide suitable support for the stripping assemblies and knife assembly to be discussed.

Tendon stripping assemblies 30a and 30b each include a shaft 32 rotatably borne by bearings 34. The forward, exposed end of shaft 32a has mounted thereon a forward disc 36a, a rear disc 38a, the same being maintained in axially spaced relationship by spacer 42a (not shown but identical to spacer 42b). Discs 36a and 38a are retained in this position by a suitable cap screw and retainer plate 44a. The rear end of shaft 32a, located within the rear drive enclosure 28, carries a pulley or sheave 46a suitably keyed thereto.

Tendon stripping assembly 30b, identically, includes shaft 32b rotatably borne through the upper front face 14 of the cabinet and the reinforcement plates 29 by bearings 34b. Mounted to the forward, exposed end of shaft 32b are forward disc 36b, rear disc 38b and spacer 42b, the same being retained in this position for rotation with shaft 32b by cap screw and retainer plate 44b. The rearward end of shaft 32b also has suitably keyed thereto a pulley or sheave 46b.

Knife assembly 50 includes shaft 52 which is rotatably borne by bearings 54 through upper front face 14 and reinforcement plates 29. Secured to the forward extremity of shaft 52 by any suitable means is a circular knife blade 56. Portions of knife blade 56 are sandwiched between discs 36a, 38a and 36b, 38b. A sheave 58 is mounted on the rear end of shaft 52.

Knife assembly 50, and particularly the bearings 54 which carry shaft 52, is preferably mounted on reinforcement plates 29 and upper front face 14 so as to be vertically adjustable over a limited distance to be described hereinafter. This is easily accomplished, as will be readily appreciated by those skilled in the art, by mounting the retaining bolts for bearings 54 through vertical slots in the cabinet structure and by providing a vertical slot, rather than a circular aperture, for passage of shaft 52 therethrough.

The blade guard assembly 60 includes a front face 62, sides 64 and a top 66. Top end 66 and front 62 have formed therein a right-angled keyhole cutout 68 having a relatively wide horizontal opening 72 which narrows at 74 along the front face 62 of the assembly. The blade guard is hinged to lip 19 of step 18 at 76 in any conventional fashion and retained in closed position by any suitable means. The keyhole 68, and specifically horizontal section 72 thereof, overlies nip 94. This permits the hock section of a drumstick to be dropped downwardly by the operator into the nip.

Drive assembly 80 includes motor 82 mounted on the forward side of lower front face 16, the shaft of the motor projecting through a suitable aperture into rear drive enclosure 28. The motor shaft has a sheave 84 affixed thereto, the same lying in generally the same vertical plane as stripping assembly sheaves 46 and knife assembly sheave 58. An idler sheave 88 is adjustably carried by an adjustment bracket 86 so as to be adjustable in this same plane. The sheaves are interconnected by a double-sided V-belt in the pattern illustrated in FIG. 4.

Tendon cutter 10, in typical use, will be secured to the loading platform of a deboning machine such as that shown in the aforenoted U.S. Pat. No. 4,327,463, permitting the operator to have easy access to the keyhole slot 68 as well as the deboning machine. With blade guard assembly 60 in its closed position, motor 82 is started, causing the stripping assemblies 30a and 30b and the knife blade 56 to rotate in the directions indicated by the arrows in FIG. 1.

Figure 5:
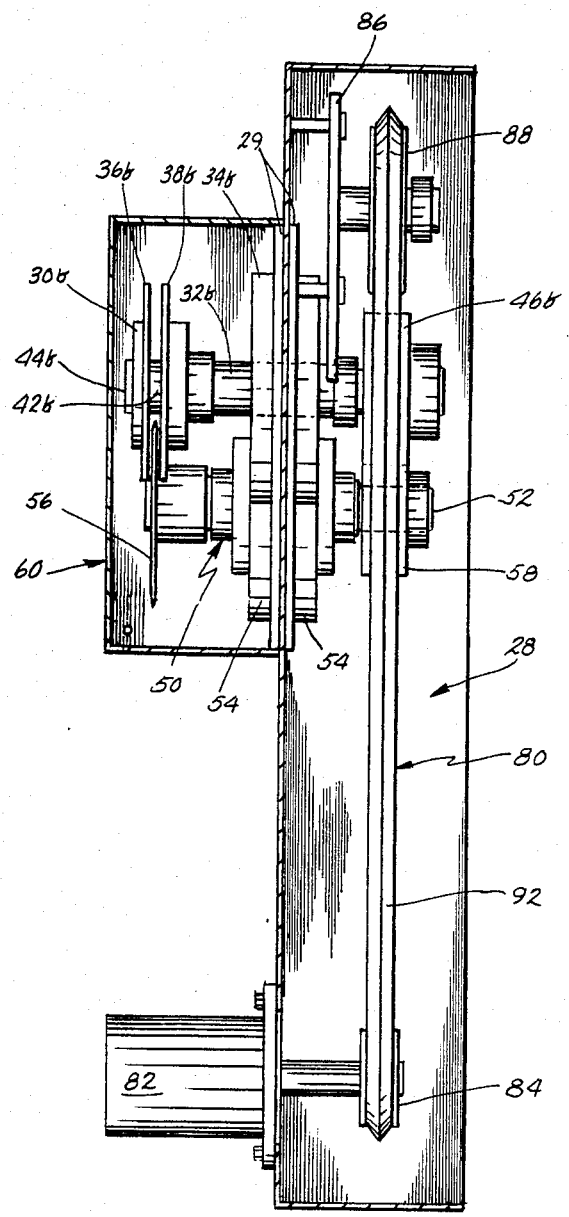
FIG. 5 is a fragmentary, cross-sectional view, partially schematic, taken generally along the plane V—V of FIG. 3.

The operator initially grasps a drumstick by the upper end, places the hock extremity, tendon side down, above right-angled keyhole slot 68 and moves it downwardly through the slot. The keyhole slot 68 is sized such that the hock or knuckle is to the right of rear discs 38a and 38b, as shown in FIG. 5, the bone area immediately above the hock passing into tendon stripping station 96 at nip 94. As the operator continues to lower the drumstick, the sides of the bone immediately above the hock are engaged by the peripheries of discs 36a and 38a on one side and 36b and 38b on the opposite side. The movement of these discs effectively strips the tendon materials lying along the sides and bottom of the bone away therefrom and forces them along with the major tendon section into severing station 98 of nip 94 where the tendon materials are cut by knife 56. The downward stripping force is exerted on the tendons on either side of the knife insuring a bunching of tendon material at the knife edge. The operator may rotate the drumstick once the bone has "bottomed" in stripping station 96 in nip 94 to facilitate the stripping and severing action if desired.

Once the tendon has been severed in the foregoing fashion, the operator lifts the drumstick upwardly through the keyhole and inserts in into the deboning apparatus. The tendon cutting process is repeated on the next drumstick while the deboning machine is deboning this drumstick.

The spacing between the disc assemblies and the position of the knife is such as to prevent the bone from contacting the knife and to prevent any tendency of the bone to be squeezed between the stripping discs. Excellent results have been obtained on turkey drumsticks, by way of example, utilizing discs 36 and 38 having a diameter of 7 inches, a knife blade 56 having a diameter of 7 inches and a spacing between the disc shafts, center-to-center, of $7\frac{3}{8}$ inches. The knife shaft is made adjustable along a line perpendicular at the midpoint of the line interconnecting the disc shafts such that its center point is movable to within about 2.3 to 2.9 inches from that interconnecting line. Knife shaft position is adjusted within this rather limited range until the desired results are achieved, depending upon the particular size, etc., of the drumstick being processed.

It is likewise important that the stripping discs 36, 38 not cut into the bone. The bone contacting edges should be relatively blunt. A thickness of 3/16 inch has been found satisfactory when severing the tendons of turkey drumsticks.

The machine may be cleaned by lowering blade guard assembly 60 about hinges 76. Steam, hot water, etc., may then be applied directly to the exposed portions of the stripping and knife assemblies. Guard assembly 60 may be retained in closed position by any conventional means.

Cutting of the tendons in the foregoing manner prior to introduction of the drumstick into the deboning machine has been found to improve substantially the results obtainable in an automated deboning process, particularly with respect to turkey legs. Partial or total severing of the tendons renders the bone by far the strongest component when tensioned and substantially reduces if not eliminates bone breakage.

While a preferred embodiment of this invention has been described in detail, it will be readily apparent to those skilled in the art that other embodiments may be conceived and fabricated without departing from the spirit and scope of this invention. Such other embodiments are to be deemed included within the scope of the appended claims unless these claims, by their language, expressly state otherwise.

The embodiments of the invention in which an exclusive property or privilege is claimed are defined as follows:

1. Apparatus for at least partially severing the tendons of a bone-containing anatomical section, one extremity of said section being composed principally of bone and tendon, said apparatus comprising:
    at least a pair of rotatable discs positioned so as to form a nip between the adjacent peripheries thereof adapted to receive said extremity, the spacing between said discs at the point of closest adjacency being less than the diameter of the bone, establishing within the wider portion of said nip a tendon stripping station and within the narrower portion of said nip a tendon severing station;
    means for rotating said discs such that the peripheries thereof move in the same direction at said nip; and
    means positioned at said tendon severing station for at least partially severing said tendons, rotation of said discs stripping at least portions of said tendons from said extremity when said extremity is placed in said stripping station and causing said tendon portions to contact said severing means at said severing station.

2. The apparatus as set forth in claim 1 wherein each of said rotatable discs is mounted on and for rotation with a disc shaft and wherein there are two spaced disc members of substantially the same diameter mounted on each such disc shaft.

3. The apparatus as set forth in claim 2 wherein said severing means comprises a circular knife and which further comprises means for rotating said knife, said knife being sandwiched between the disc members on each of said shafts and having its cutting edge extending into said severing station.

4. The apparatus as set forth in claim 3 wherein said knife is mounted on and for rotation with a knife shaft, said knife shaft being positioned opposite said nip.

5. The apparatus as set forth in claim 3 wherein said disc shafts are parallel defining a first plane, said nip being on one side of said plane, wherein said knife shaft is parallel to said disc shafts and is positioned on the other side of said first plane and which further comprises a guard overlying said disc members and said knife, said guard having an aperture therein through which said extremity may be introduced to said nip.

6. The apparatus as set forth in claim 5 wherein said disc shafts define a generally horizontal plane, wherein said knife shaft is located below said disc shafts, wherein said guard has a top and a front face and wherein said aperture extends along said top above said nip and downwardly along said front face whereby said extremity may be moved downwardly from above said guard into said nip.

7. Apparatus for at least partially severing the tendons of a bone-containing anatomical section, one extremity of said section being composed primarily of bone and tendon, said apparatus comprising:

first and second spaced movable means for defining a nip therebetween adapted to receive said extremity, the spacing between said means at the point of closest adjacency being less than the diameter of the bone, establishing within the wider portion of said nip a tendon stripping station and within the narrower portion of said nip a tendon severing station;

means for moving said nip-defining means in the same direction at said nip; and means positioned at said tendon severing station for at least partially severing said tendons, movement of said nip-defining means stripping at least portions of said tendons from said extremity when said extremity is placed in said stripping station and causing said tendon portions to contact said severing means at said severing station.

* * * * *